United States Patent
Carey (10) Patent No.: US 10,644,967 B2
(45) Date of Patent: May 5, 2020

(54) METHODS, APPARATUSES AND COMPUTER-READABLE STORAGE MEDIUMS FOR AUTOMATED ONBOARDING OF SERVICES IN THE USER SERVICES PLATFORM

(71) Applicant: Nokia Technologies OY, Espoo (FI)

(72) Inventor: Timothy Carey, Corpus Christi, TX (US)

(73) Assignee: Nokia Technologies OY, Espoo (FI)

( * ) Notice: Subject to any disclaimer, the term of this patent is extended or adjusted under 35 U.S.C. 154(b) by 211 days.

(21) Appl. No.: 15/720,330

(22) Filed: Sep. 29, 2017

(65) Prior Publication Data

US 2019/0104033 A1    Apr. 4, 2019

(51) Int. Cl.
*H04L 12/24* (2006.01)
*H04L 29/08* (2006.01)
*H04L 29/12* (2006.01)
*H04W 4/70* (2018.01)

(52) U.S. Cl.
CPC .... *H04L 41/5058* (2013.01); *H04L 29/08648* (2013.01); *H04L 41/046* (2013.01); *H04L 41/0806* (2013.01); *H04L 61/2076* (2013.01); *H04L 61/305* (2013.01); *H04L 67/16* (2013.01); *H04W 4/70* (2018.02); *H04L 61/1511* (2013.01); *H04L 61/1541* (2013.01)

(58) Field of Classification Search
None
See application file for complete search history.

(56) References Cited

U.S. PATENT DOCUMENTS

| | | | |
|---|---|---|---|
| 2014/0075239 A1* | 3/2014 | Prathipati | H04L 29/14 714/4.1 |
| 2015/0067036 A1 | 3/2015 | Nambiar et al. | |
| 2016/0020962 A1 | 1/2016 | Carey et al. | |
| 2016/0112497 A1* | 4/2016 | Koushik | H04L 67/10 726/7 |

(Continued)

OTHER PUBLICATIONS

Broadband Forum, WT-369 Revision, User Services Platform, 1.0-Draft-2, Jun. 2017 pp. 1-116.

(Continued)

*Primary Examiner* — Natisha D Cox
(74) *Attorney, Agent, or Firm* — Harness, Dickey & Pierce, P.L.C.

(57) ABSTRACT

A User Services Platform endpoint determines that applicable services are available for a connected device attached to a local network based on a neighbor discovery protocol message from the connected device; and outputs a User Services Platform device notification message to a User Services Platform endpoint associated with the local network. A User Services Platform administrative authority endpoint device determines an applicable service for a connected device based on a User Services Platform message identifying the connected device; provisions service elements for the applicable service to a User Services Platform endpoint associated with the applicable service and the connected device, the service elements enabling the User Services Platform endpoint to implement the applicable service in association with the connected device; and receives notification that the service elements for the applicable service have been provisioned at the User Services Platform endpoint.

14 Claims, 5 Drawing Sheets

(56) References Cited

U.S. PATENT DOCUMENTS

2016/0134616 A1* 5/2016 Koushik ............ H04L 63/0807
                                              726/9
2016/0254962 A1* 9/2016 Ansari ................ H04L 12/2803
                                              709/225

OTHER PUBLICATIONS

Broadband Forum, TR-069, Device:2.12 Root Object definition, tr-181-2-12.xml, Jul. 2017, pp. 1-427.
International Search Report and Written Opinion dated Oct. 18, 2018 in Internatioinal Application No. PCT/US18/48261.

* cited by examiner

METHODS, APPARATUSES AND COMPUTER-READABLE STORAGE MEDIUMS FOR AUTOMATED ONBOARDING OF SERVICES IN THE USER SERVICES PLATFORM

BACKGROUND

Field

One or more example embodiments relate to methods, apparatuses and/or computer-readable storage mediums for automated onboarding of services in the User Services Platform (USP).

Discussion of Related Art

The User Services Platform (USP) includes a network of USP endpoints, each including at least one of a controller and an agent, which allow applications to manipulate service elements that reflect some functionality exposed by a device. The manipulation of a service element is done through the exchange of USP messages using the USP protocol.

SUMMARY

The User Services Platform (USP) provides a mechanism for one or more agents at a USP endpoint to establish a trusted relationship with one or more controllers (Controller Trust) at other USP endpoints. Conventionally, however, the USP does not provide the ability for Internet-of-Things (IoT) service providers to offer IoT services (e.g., Home Automation, Home Security, or the like) to users/subscribers based on a particular device when the device is initially recognized by (or, alternatively, initially attached to) the service provider's network.

To provide this additional functionality, one or more example embodiments provide methods, apparatuses and/or computer-readable storage mediums for automated onboarding of services using the USP.

At least one example embodiment provides a User Services Platform administrative authority endpoint device comprising: a memory storing computer readable instructions; and at least one processor. The at least one processor is configured to execute the computer readable instructions to: determine, from among a plurality of services, an applicable service for a connected device based on a User Services Platform message identifying the connected device; provision service elements for the applicable service to a User Services Platform endpoint associated with the applicable service and the connected device, the service elements enabling the User Services Platform endpoint to implement the applicable service in association with the connected device; and receive notification that the service elements for the applicable service have been provisioned at the User Services Platform endpoint.

At least one other example embodiment provides a User Services Platform endpoint device comprising: a memory storing computer readable instructions; and at least one processor. The at least one processor is configured to execute the computer readable instructions to: acquire software modules associated with an applicable service in response to a User Services Platform software download command message, the applicable service associated with a connected device attached to a local network; acquire security and communication information associated with the connected device in response to User Services Platform security and communication information messages; activate the acquired software modules to onboard service elements for the applicable service at the User Services Platform endpoint device; and output a User Services Platform event notification message indicating that the service elements for the applicable service have been onboarded at the User Services Platform endpoint device.

At least one other example embodiment provides a User Services Platform discovery authority endpoint device comprising: a memory storing computer readable instructions; and at least one processor. The at least one processor is configured to execute the computer readable instructions to: determine that applicable services are available for a connected device attached to a local network based on a neighbor discovery protocol message from the connected device; and output a User Services Platform device notification message to a User Services Platform endpoint associated with the local network, the User Services Platform device notification message including identification information identifying the connected device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments will be described from the perspective of controllers, agents, or other applicable electronic devices or endpoints, it will be understood that one or more example embodiments discussed herein may be performed by the one or more processors (or processing circuitry) at the applicable device or endpoint.

Figure 1:
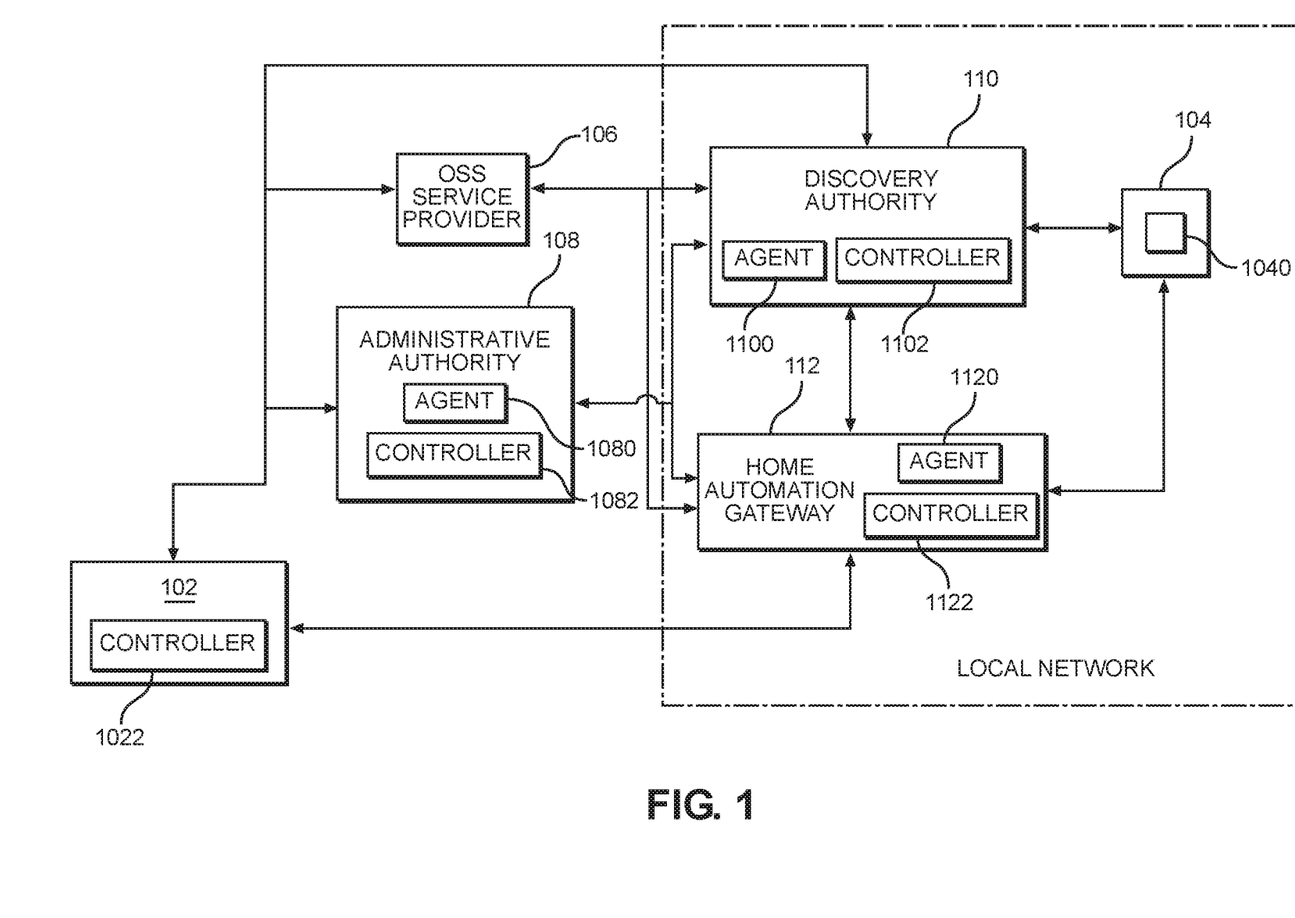
FIG. 1 is a block diagram illustrating a portion of an example User Services Platform (USP) network architecture.

FIG. 1 is a block diagram illustrating a portion of an example User Services Platform (USP) network architecture.

As mentioned above, the USP network architecture includes a network of USP endpoints (e.g., at one or more connected devices), each of which includes at least one of a controller or an agent. An agent is a USP endpoint that exposes a service element to a controller at another connected device. A controller is a USP endpoint that manipulates service elements through an agent at another connected device. A service element is a general term referring to a set of Objects, sub-Objects, commands, events, and parameters that comprise a set of functionality that is manipulated by a controller on an agent. An agent's service elements are represented in a data model. A connected device refers to devices such as network connected customer premises equipment (CPE), consumer electronics, computing resources, or the like.

A USP endpoint can act as an agent or a controller. Controllers only send USP messages to agents, and agents only send USP messages to controllers. That is, for example, controllers communicate with agents, rather than other controllers, and agents communicate with controllers, rather than other agents. Thus, a USP endpoint in the USP platform may include both an agent and a controller such that the USP endpoint may communicate with both agents and controllers at other USP endpoint. As discussed herein, a USP endpoint may also be referred to as a USP endpoint device or a connected device.

A USP endpoint may communicate with other endpoints using one or more Message Transfer Protocols (MTP) that may or may not be secure.

A USP message refers to the contents of a USP layer communication including a message header and a message body. In addition to the information discussed herein, the message body may include, for example, a Request, Response or Error, and the message header may include elements that provide information regarding the message, such as an endpoint identifier of the sender and receiver, the message type, and message identification (Message ID) elements. A Message ID is an identifier used to associate a Response or Error with a Request.

Referring now to FIG. 1, the portion of the USP network architecture includes a plurality of USP endpoints, each of which is illustrated as a separate device. The plurality of USP endpoints include: a user device 102; an operations support system (OSS) service provider 106; an administrative authority (also referred to as a USP administrative authority endpoint or endpoint device) 108; a discovery authority (also referred to as a USP discovery authority endpoint or endpoint device) 110; a home automation gateway 112; and a connected device 104. Each of the plurality of USP endpoints shown in FIG. 1 are configured to communicate and/or exchange USP messages with others of the USP endpoints either directly or indirectly via one or more networks. Although shown in FIG. 1 as separate connected devices, it should be understood that the plurality USP endpoints may be grouped together, and implemented on one or more computers or servers (e.g., via one or more virtual machines). Furthermore, the plurality of USP endpoints may alternatively be represented by the same USP endpoint.

In the example embodiment shown in FIG. 1, the user device 102 includes a controller 1022; the administrative authority 108 includes an agent 1080 and a controller 1082; the discovery authority 110 includes an agent 1100 and a controller 1102; the home automation gateway 112 includes an agent 1120 and a controller 1122; and the connected device 104 includes an agent 1040. However, it should be understood that each of the USP endpoints shown in FIG. 1 may act as both a controller and an agent as needed. Further, although discussed as "including," it should be understood that each of the USP endpoints may also be described as acting as at least one of an agent and a controller.

Still referring to FIG. 1, the user device 102 may be an end user device such as a smartphone, computer, or the like, including the controller 1020. In one example, the user device 102 runs an application that enables a user/subscriber to control a service element at connected device 104 from within or outside of the local network to which the connected device 104 is attached.

The administrative authority 108 is a service provider management system that provides management functions similar to the TR-069 Auto-Configuration Server (ACS) in order to configure and troubleshoot controllers and agents in the home network or domain. In at least one example embodiment, the administrative authority 108 maintains a catalog (e.g., an indexed and searchable database or repository) of services compatible with different types of IoT devices and associated information that includes the firmware or software modules required to support compatible services and/or collaborating devices. In addition, the administrative authority 108 orchestrates (e.g., directly or indirectly via another entity) advertisement and acceptance of a compatible service with the subscriber/user of a given connected device. The administrative authority 108 also orchestrates the deployment, installation and activation of compatible services on the necessary devices/hosts.

When the administrative authority 108 has completed the orchestration of compatible services with other collaborating devices, the administrative authority 108 instructs each of the collaborating devices involved with a compatible service to initiate an onboard request with any controllers that need to be involved in the compatible service. These controllers then inform the administrative authority 108 that the onboarding of the service and/or device has completed. In one example, the collaborating devices may include at least the home automation gateway 112. However, example embodiments should not be limited to this example.

Still referring to FIG. 1, the OSS service provider 106 is a set of one or more service provider management systems that provide management aspects to configure and troubleshoot services and network elements located within a service provider's network.

According to at least some example embodiments, the OSS service provider 106 interacts with the end user (e.g., via the user device 102, a web portal, an application executed on an electronic device, or the like) to offer and accept offered services as well as coordinate various management systems to affect activation of the accepted services. The OSS service provider 106 also delegates some of the activities for setup and activation of the service to the administrative authority 108.

The discovery authority 110 listens for newly added agents in the local network. In one example, the discovery authority 110 inspects the communication flows (e.g., USP Domain Name Service-Service Definition (DNS-SD) messages, Address Resolution Protocol (ARP) requests, Universal Plug and Play (UPnP), or the like) emitted from a device within the home network to determine if the communication pattern or information emitted by the device can be correlated to a catalog of known devices. If the device is recognized, then the discovery authority 110 informs the administrative authority 108 of the newly recognized device.

The discovery authority 110 maintains (or has access to, e.g., at the OSS service provider 106) a catalog of device types provided by the service provider. This catalog may be in the form of an indexed database or repository configured to allow use of discovered and/or advertised information for newly recognized (e.g., added) device to identify the type of the device by matching the identity of the discovered device with a type of device stored in the catalog. In one example, the catalog may include an identity of an IoT device, manufacturer and manufacturer's product class (model number) of the device, and the type of IoT device.

Although the discovery authority 110 is shown as a separate device, example embodiments should not be limited to this example. Rather, the functionality of the discovery authority 110 may reside in, for example, a home gateway provided by a service provider.

The home automation gateway 112 is a central hub from which a home automation system is controlled through a user interface that interacts with the user device 102. According to one or more example embodiments, the user interface may be provided by an application running on the user device 102, such as a smartphone or other electronic device.

In the example embodiment shown in FIG. 1, the OSS service provider 106 and the administrative authority 108 reside in the cloud, whereas the discovery authority 110, the home automation gateway 112 and the connected device 104 reside within a local network (e.g., a local area network (LAN) or wireless LAN within a home or office). As discussed herein, the local network may also be referred to as a home network. The components residing on one or more servers in the cloud may communicate with the components residing in the local network via, for example, the Internet. The user device 102 may communicate with the components in the cloud and those connected to the local network via the Internet as well. Although illustrated outside the local network, the user device 102 may also reside within the local network. Example embodiments should not, however, be limited to the configuration of the network architecture shown in FIG. 1.

Still referring to FIG. 1, the connected device 104 may be an IoT device including one or more service elements. In one example, the connected device 104 may be an Internet Protocol (IP)-based camera, a smart television, a home automation or security devices (e.g., light switches, electrical outlets, thermostats, open/closed window sensors, or the like), a kitchen appliance (e.g., refrigerator), or the like.

Example operation and interaction of the USP endpoints shown in FIG. 1 will be discussed in more detail with regard to FIGS. 2-4.

Figure 2:
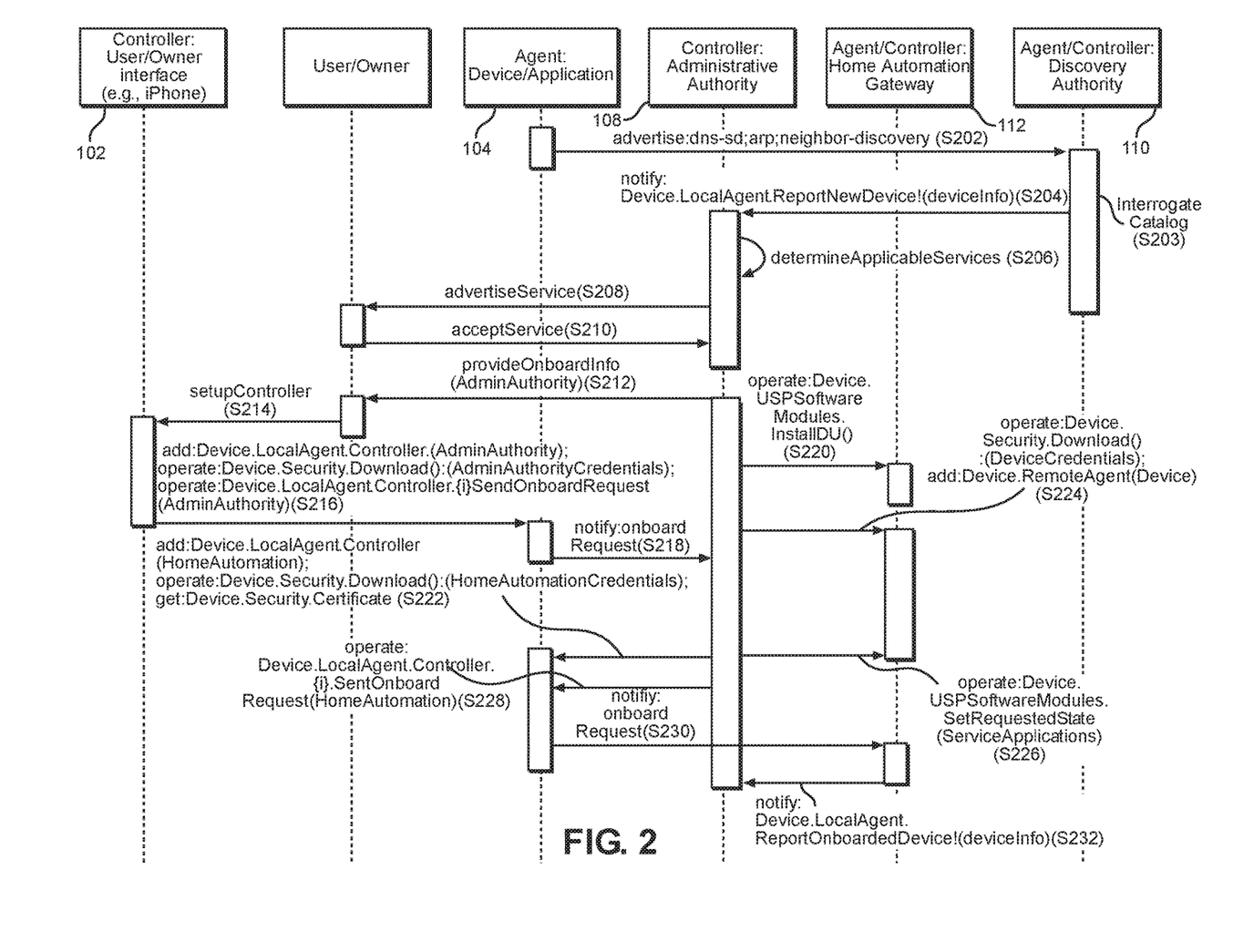
FIG. 2 is a signal flow diagram illustrating an example embodiment of a method for automated onboarding of services in the USP.

FIG. 2 is a signal flow diagram illustrating an example embodiment of a method for automated onboarding of services in the USP architecture shown in FIG. 1.

Referring to FIG. 2, at operation S202, the agent 1040 at the connected device 104 advertises its presence on the home network. In at least one example, the connected device 104 may advertise its presence upon initial connection to the local network.

In the example shown in FIG. 2, the agent 1040 at the connected device 104 advertises its presence by outputting a DNS-SD message (advertise:dns-sd;arp;neighbor-discovery), which is received by the listening controller 1102 at the discovery authority 110. The DNS-SD message includes identification information and communication protocol information for the agent 1040 at the connected device 104, which enables the controller 1102 at the discovery authority 110 to identify the type of device for the connected device 104. The identification information may include an identity of the connected device (or service element residing thereon), manufacturer and manufacturer's product class (model number), and the type of service element at the connected device 104. In the example shown in FIG. 2, the agent 1040 at the connected device 104 utilizes the DNS-SD protocol to advertise its existence to the controller 1102 at the discovery authority 110. However, example embodiments should not be limited to this example. Rather, other Neighbor Discovery protocols such as ARP, IPv6 Neighbor Discovery, or the like may be used.

In response to receiving the DNS-SD message, at operation S203 the discovery authority 110 interrogates (e.g., searches) the catalog of devices for which services may be offered to identify whether there are services to be offered in connection with the newly discovered connected device 104 using the received identification information. As discussed above, the catalog of devices may be stored in an indexed and searchable database or repository.

In one example, the connected device 104 may be an Internet Protocol (IP)-based camera, a smart television, a home automation or security devices (e.g., light switches, electrical outlets, thermostats, open/closed window sensors, or the like), a kitchen appliance (e.g., refrigerator), or the like.

If the connected device 104 is not in the catalog of devices, then the process terminates. If, however, the connected device 104 is in the catalog of devices, then at operation S204 the agent 1100 at the discovery authority 110 outputs a USP device notification message for an event (reportNewDevice!(deviceInfo)) to the controller 1082 at the administrative authority 108. The USP device notification message indicates that the discovery authority 110 has discovered a device that has potential (or candidate) services to be offered to the subscriber/user of the connected device 104. The USP device notification message may include identification information for the connected device 104. In one example, the identification information may include the manufacturer of the device, product class, serial number, agent endpoint ID, or the like.

In response to receiving the USP device notification message, at operation S206 (determineApplicableServices) the administrative authority 108 identifies services to be offered to a subscriber/user for the connected device 104. In one example, the administrative authority 108 searches the catalog (e.g., an indexed and searchable database or repository) of services to identify the services compatible with the connected device 104. The service or services compatible with the connected device 104 identified at operation S206 may also be referred to as applicable service(s).

Once having identified services to be offered to the user/subscriber, at operation S208 the administrative authority 108 outputs a USP service advertisement message (advertiseService) to notify the user/subscriber of the identified services. In one example, the administrative authority 108 may output the USP service advertisement message to the user/subscriber through one or more portals/channels (e.g., online accounts, emails, text messages, voice calls, or the like).

After notifying the user/subscriber of the identified services, when the administrative authority 108 receives a service acceptance message (acceptService) via the one or more portals/channels at operation S210, then at operation S212 the administrative authority 108 provides onboard information (provideOnboardInfo(AdminAuthority) to the subscriber/user via the one or more portals/channels. The onboard information allows the subscriber/user to onboard the administrative authority 108 such that at the end of the onboarding event, the administrative authority 108 is able to manage the device. Onboarding may entail configuring the device with information in order for the device establish a USP communication session with the administrative authority as well as establishing the correct security context within the device for what the administrative authority 108 is authorized to perform. The onboard information includes information enabling the controller 1022 at the user device 102 to successfully communicate with the agent 1080 at the administrative authority 108, the information needed to allow the administrative authority 108 to control the agent 1040 at the connected device 104 and implementing the service identified at operation S206. According to at least one example embodiment, information enabling the controller 1082 at the administrative authority 108 to communicate with the agent 1040 at the connected device 104 includes the identity and necessary security credentials of the controller 1082. The controller 1082 may also setup the security roles for the administrative authority 108.

After the user/subscriber inputs the information received from the administrative authority 108 into the user device 102 at operation S214, the controller 1022 at the user device 102 outputs a set of USP configuration commands to the agent 1040 at the connected device 104 at operation S216. In the example shown in FIG. 2, the set of USP configuration commands include: a controller configuration command (add:Device.LocalAgent.Controller(AdminAuthority)) to configure the agent 1040 with a controller entry for the controller 1022; a security download command (operate: Device.Security.Download( ): (AdminAuthorityCredentials)) requesting download of security credentials needed to communicate with the administrative authority to the agent 1040; and an onboard notification request command (operate: Device.LocalAgent.Controller.{i}SendOnboardRequest (AdminAuthority)) requesting that the agent 1040 send an onboard request notification message (onboardRequest) to the controller 1082 at the administrative authority 108. The controller configuration command (add:Device.LocalAgent-.Controller(Admin Authority)) includes information (e.g., communication protocol, security credential, security role, and the like) for the agent 1040 to establish a USP session with the controller 1082 at the administrative authority 108. The security download command (operate:Device.Security-.Download( ): (AdminAuthorityCredentials)) provides the agent 1040 with the location of the credentials for the controller 1082 at the administrative authority 108. The onboard notification request command (operate: Device.LocalAgent.Controller.{i}SendOnboardRequest (AdminAuthority)) conveys the USP identifier of the controller 1082 at the administrative authority 108.

In response to receiving the set of USP configuration commands, at operation S218 the agent 1040 at the connected device 104 outputs the USP onboard request notification message (notify:onboardRequest) to the controller 1082 at the administrative authority 108. The USP onboard request notification message informs the administrative authority 108 that at least the onboard notification request command has been received successfully.

At operation S220, the controller 1082 at the administrative authority 108 outputs a USP software download command message (operate:Device.USPSoftwareModules.InstallDU( )) to the agent 1120 at the home automation gateway 112. The USP software download command message (operate:Device.USPSoftwareModules.InstallDU( )) includes the location of a software module to be downloaded (or, alternatively, acquired) and installed at the home automation gateway 112. In response to receiving the USP software download command message (operate: Device.USPSoftwareModules.InstallDU( )), the home automation gateway 112 downloads and installs software that is needed to implement the requested services (e.g., home surveillance, home automation, and the like) into the execution environment of the agent 1040 of the connected device 104.

At operation S222, the controller 1082 at the administrative authority 108 outputs a set of USP home automation configuration messages to the agent 1040 at the connected device 104 to allow the agent 1040 to communicate with the controller 1122 at the home automation gateway 112. In this example, the set of USP home automation configuration messages includes: an add:Device.LocalAgent.Controller (HomeAutomation) message to configure the agent 1040 at the connected device 104 with a new controller entry for the controller 1122 at the home automation gateway 112; an operate:Device.Security.Download( ):(HomeAutomation-Credentials) message requesting download of the security credentials for the controller 1122 at the home automation gateway 112; and a get:Device.Security.Certificate message to retrieve the requested security credentials of the agent 1040. In one example, the add:Device.LocalAgent.Controller(HomeAutomation) message includes information (e.g., communication protocol, security credentials, security roles, or the like) that allows the agent 1040 at the connected device 104 to establish a USP session with the controller 1122 at the home automation gateway 112. The operate: Device.Security.Download( ):(HomeAutomationCredentials) message includes the location of the credentials for the controller 1122 at the home automation gateway 112. The get:Device.Security.Certificate message requests return of the security credentials for the user device 102 that is used to identify the agent 1040 to the controller 1122 at the home automation gateway 112.

Still referring to FIG. 2, at operation S224, the controller 1082 at the administrative authority 108 sends a USP message (operate:Device.Security.Download( ):(DeviceCredentials)) that downloads (or, alternatively, acquires) the security credentials (also referred to herein as security information) of agent 1040 and a USP message (add:Device.RemoteAgent(Device)) that configures the communication information for agent 1040 to the agent 1120 at the home automation gateway 112 in order for controller 1122 to communicate with agent 1040. The USP message that configures a remote agent includes information (e.g., communication protocol, security credentials, or the like) for the controller 1122 at the home automation gateway 112 to establish a USP session with the agent 1040 at the connected device 104.

At operation S226, the controller 1082 at the administrative authority 108 outputs a USP message (operate: Device.USPSoftwareModules.SetRequestedState(ServiceApplications)) to the agent 1120 at the home automation gateway 112 to activate the installed software in the execution environment of the agent 1040 at the connected device 104 for the previously installed software for the services accepted by the user. In one example, this USP message (sometimes referred to herein as a USP activation/deactivation command message) includes the identifier of the software module to be activated/deactivated and the requested state action (activate or deactivate).

At operation S228, the controller 1082 at the administrative authority 108 sends a USP message (operate: Device.LocalAgent.Controller.{i}.SendOnboardRequest (HomeAutomation)) to request that the agent 1040 at the connected device 104 send a USP onboardRequest notification to the controller 1122 at the home automation gateway 112. In this example, the USP onboardRequest notification includes the USP identifier of the controller 1122 at the home automation gateway 112.

In response to receiving the USP message (operate: Device.LocalAgent.Controller.{i}.SendOnboardRequest (HomeAutomation)) from the controller 1082 at the administrative authority 108, at operation S230 the agent 1040 at the connected device 104 sends USP onboardRequest notification (notify:onboardRequest) to the controller 1122 at the home automation gateway 112. The USP onboardRequest notification request command sent at operation S230 provides the same information as the USP onboardRequest notification request command sent in operation S228, but is sent to the controller 1122 at the home automation gateway 112 instead of the controller 1082 at the administrative authority 108.

In response to the USP onboardRequest notification from the agent 1040 at the connected device 104, the agent 1120 at the home automation gateway 112 outputs an event notification (notify:Device.LocalAgent.ReportOnboardedDevice!(deviceInfo)) to the controller 1082 at the administrative authority 108 once the actions needed to onboard the services for the connected device 104 have been completed by the controller 1122 at the home automation gateway 112. The event notification may include identification information (e.g., manufacturer, product class, serial number, agent endpoint ID, or the like) for the connected device 104.

Once the services (e.g., home surveillance, home automation, or the like) for the connected device 104 have been installed and activated at the home automation gateway 112, the home automation gateway 112 performs the necessary functions for that service and type of device. For example, in the context of a home surveillance system, where the connected device 104 is an IP camera, a control session is established between the home automation gateway and the IP camera to allow control of the IP camera by the home automation gateway 112. Other connections may also be established to either stream the content of the IP camera or periodically upload the content of IP camera. An alarm channel may also be established to permit the IP camera to notify the home automation gateway 112 of activity sensed by the IP camera. These messages and channels may use USP messages or other communication protocols (e.g., Zigbee, Internet Engineering Task Force Constrained Application Protocol (IETF CoAP), or the like) that are translated by the home automation gateway 112.

Figure 3:
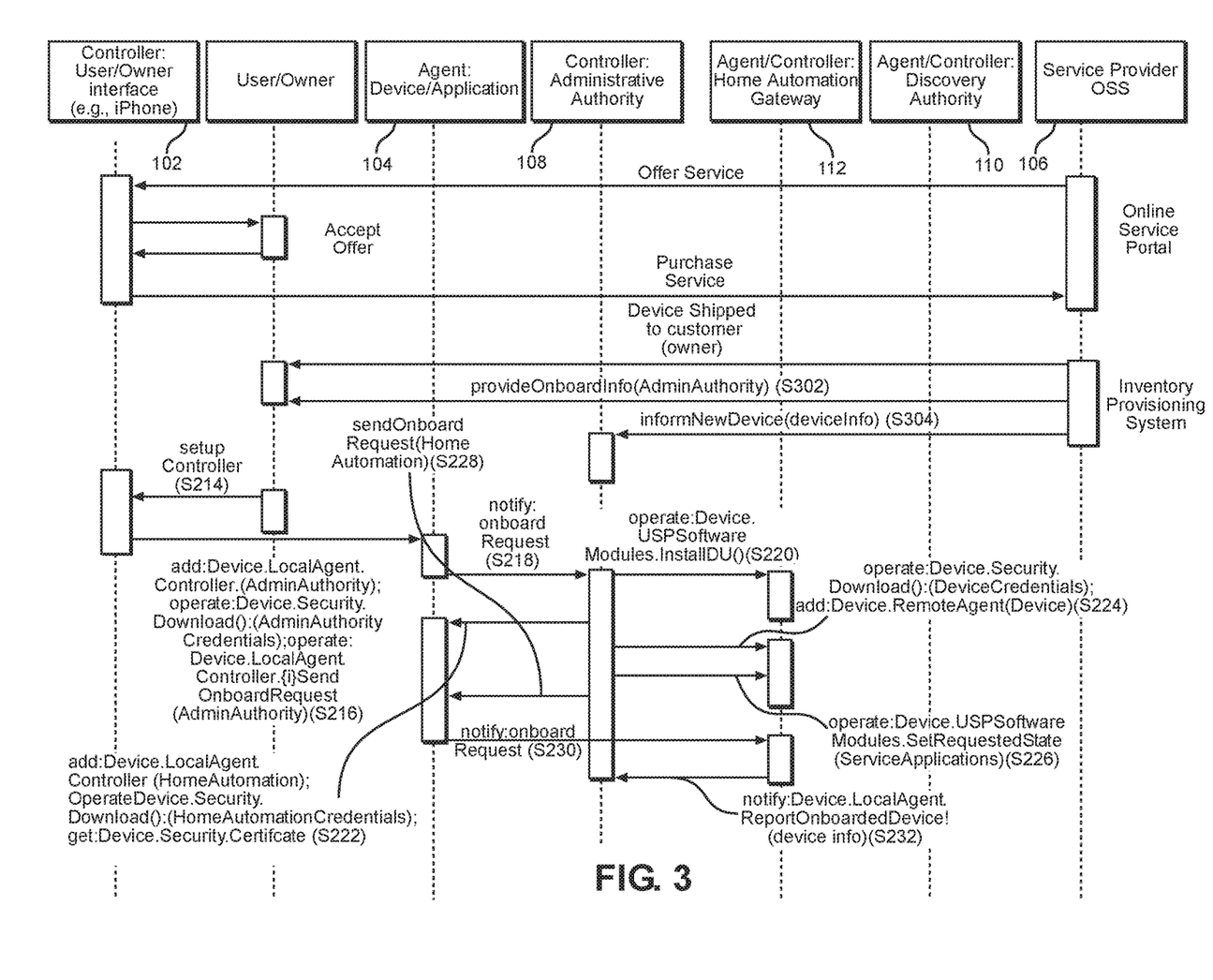
FIG. 3 is a signal flow diagram illustrating another example embodiment of a method for automated onboarding of services in the USP.

FIG. 3 is a signal flow diagram illustrating another example embodiment of a method for automated onboarding of services in the USP architecture shown in FIG. 1.

The method shown in FIG. 3 is an example embodiment in which pre-provisioned onboarding is utilized. In this example, the discovery functionality provided by operations S202 through S212 in FIG. 2 are replaced by a pre-provisioning procedure. After the pre-provisioning procedure is completed, operations S214 through S232 discussed above with regard to FIG. 2 are performed. Because operations S214 through S232 in FIG. 3 are the same as those discussed above, detailed discussion of these operations will be omitted here.

Referring to FIG. 3, in this example embodiment, the user/subscriber purchases an offered service through, for example, an online service portal at the OSS service provider 106, and a device associated with the purchased service is provided (e.g., shipped) to the user/subscriber. Additionally, once having completed purchase of the offered service, the OSS service provider 106—rather than the administrative authority 108 in the method of FIG. 2—outputs the USP onboard information message (provideOnboardInfo(AdminAuthority)) to the subscriber/user through an inventory provisioning system that maintains the information related to the devices that the service provider has given the subscriber to use to implement the purchased services at operation S302. The USP onboard information message is the same as the USP onboard information message discussed above with regard to S212 in FIG. 2.

At operation S304, the OSS service provider 106 outputs a message (informNewDevice(deviceInfo)) to the administrative authority 108 to inform the administrative authority 108 that a subscriber has been provided a new device with the information necessary to establish a USP session with the agent at the device associated with the purchased service.

The method then proceeds with operations S214 through S232 discussed above with regard to FIG. 2.

As described above with regard to FIG. 2, once the services (e.g., home surveillance, home automation, or the like) for the connected device 104 have been installed and activated at the home automation gateway 112, the home automation gateway 112 performs the necessary functions for that service and type of device.

Figure 4:
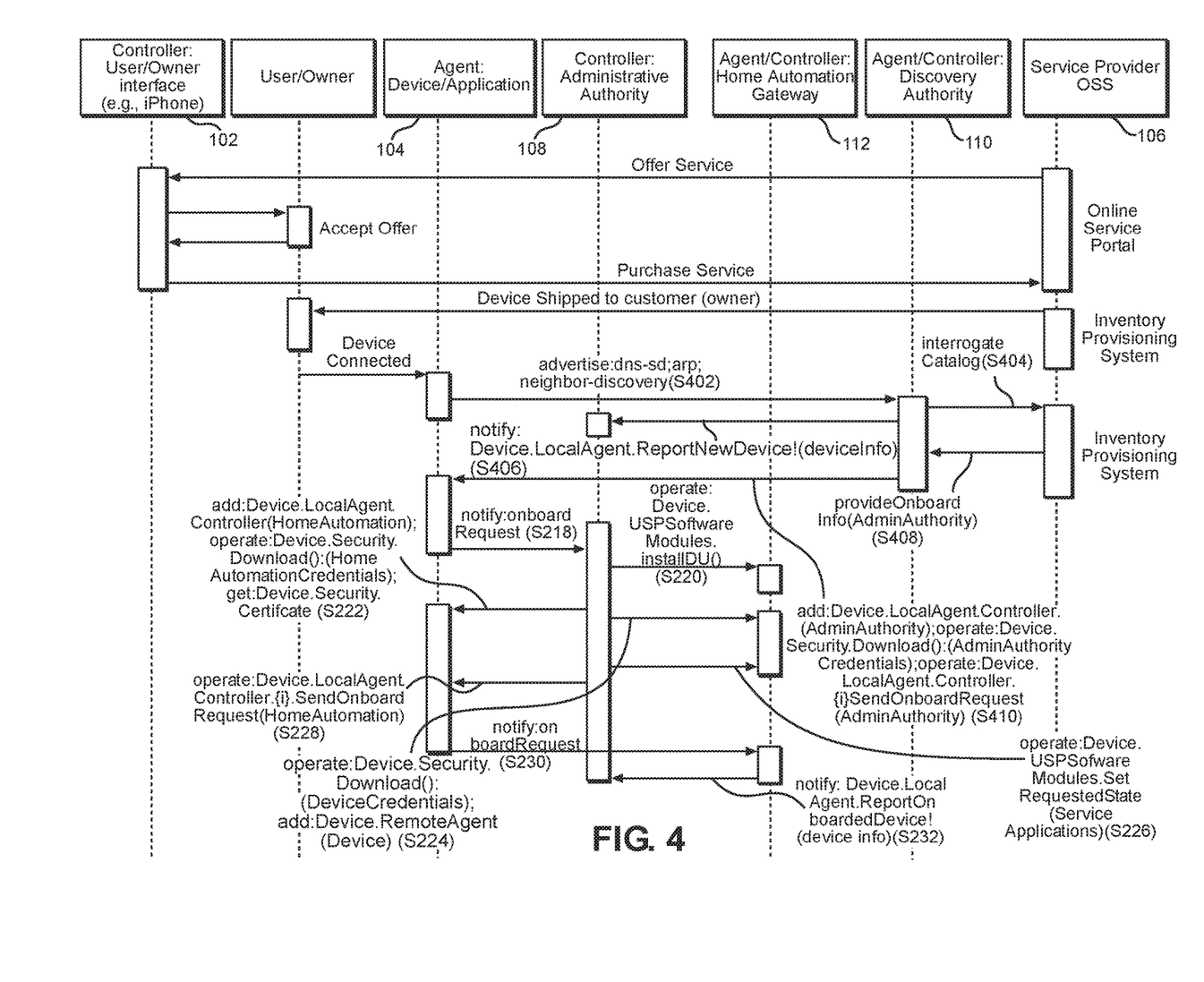
FIG. 4 is a signal flow diagram illustrating yet another example embodiment of a method for automated onboarding of services in the USP.

FIG. 4 is a signal flow diagram illustrating yet another example embodiment of a method for automated onboarding of services in the USP architecture shown in FIG. 1.

The method shown in FIG. 4 is an example embodiment in which zero-touch onboarding is utilized. In this example embodiment, the user/subscriber purchases an offered service through an online service portal at the OSS service provider 106, and the connected device 104 associated with the purchased service is provided (e.g., shipped) to the user/subscriber.

When the user/subscriber connects the connected device 104 to the local network, at operation S402, the agent 1040 at the connected device 104 advertises and/or notifies the controller 1102 at the discovery authority 110, which is listening for newly added agents, of its existence. Operation S402 is the same as operation S202 in FIG. 2, and thus, a detailed discussion will be omitted.

In response to receiving the notification, at operation S404 the discovery authority 110 interrogates (e.g., searches) the catalog of devices for which services may be offered to identify whether there are services to be offered in connection with the connected device 104 using the received identification information. As discussed above, the catalog of devices may be stored in an indexed and searchable database or repository. In this example, the catalog of devices is at the OSS service provider 106. Accordingly, at operation S404, the discovery authority 110 interrogates the catalog of devices at the OSS service provider 106.

In response to the interrogation operation S404, the OSS service provider 106 outputs a message (provideOnboardInfo(AdminAuthority)) to the discovery authority 110 at operation S408. The message output at operation S408 is the same as the message output by the administrative authority 108 at operation S212 in FIG. 2.

The agent 1100 at the discovery authority 110 also outputs a USP device notification message (notify:Device.LocalAgent.ReportNewDevice!(deviceInfo)) to the controller 1082 at the administrative authority 108 at operation S406. The USP device notification message notifies the administrative authority 108 of the connected device 104, and may include identification information for the connected device 104. In one example, the identification information may include the manufacturer of the home automation device, product class, serial number, agent endpoint ID, and the like.

At operation S410, the controller 1102 at the discovery authority 110, rather than the user device 102 at operation S216 in FIG. 2, outputs the set of USP configuration commands to the agent 1040 at the connected device 104. The set of USP configuration commands output at operation S410 are the same as those output by the controller 1022 at the user device 102 at operation S216 in FIG. 2, and thus, further discussion is omitted.

The procedure shown in FIG. 4 then continues with operations S218 through S232 discussed above with regard to FIG. 2 to complete the zero-touch onboarding process for the connected device.

As described above with regard to FIGS. 2 and 3, once the services (e.g., home surveillance, home automation, or the like) for the connected device 104 have been installed and activated at the home automation gateway 112, the home automation gateway 112 performs the necessary functions for that service and type of device.

As discussed herein, in one example, at least operations S208 through S230 may be characterized as a provisioning or onboarding operation. In another example, operations S212 through S230 may be characterized as a provisioning or onboarding operation. In yet another example, operation S232 may be included in what is considered the provisioning or onboarding operation.

One or more example embodiments provide methods, via the discovery authority, to recognize a connected device that may use various services (e.g., home automation, home security, or the like) provided by a service provider, and then inform an administrative authority of the connected device. The notification of the device from discovery authority toward the administrative authority increases the ecosystem of potential devices that may be provided services as devices such as retail devices need not have the information required to contact the administrative authority directly. One or more example embodiments also improves the efficiency for identifying newly connected devices as the administrative authority no longer needs to be contacted by the connected device to recognize the connected device. Rather, the discovery authority, which is typically located within the same network domain as the connected device, recognizes the addition of the connected device.

One or more example embodiments may also provide a method in which an endpoint device may report successful onboarding of a service for newly discovered devices. The notification that the service has been successfully onboarded completes the fulfillment process, which is missing in the current USP. In one example, the home automation gateway (or other USP endpoint) reports the successful onboarding of the service based on previous actions by the administrative authority. This may also improve the efficiency of the fulfillment process as the administrative authority need not poll the USP endpoints involved in the service; instead the USP endpoints report when they are ready to provide the service.

Figure 5:
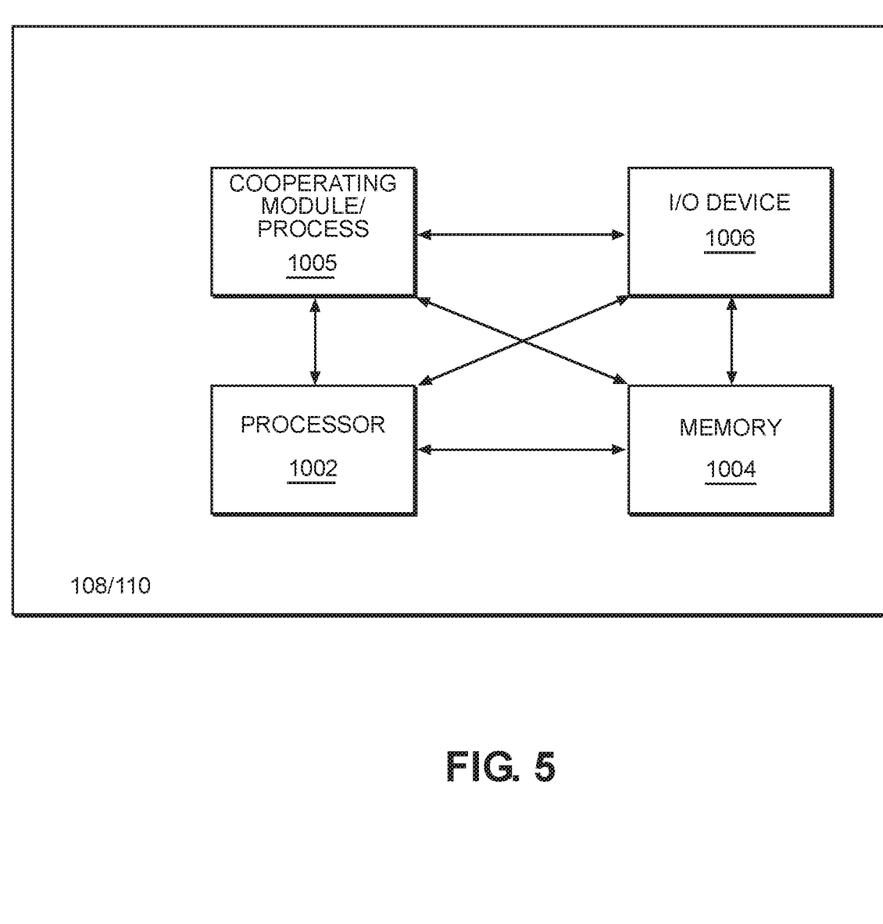
FIG. 5 provides a general architecture and functionality suitable for implementing functional elements described herein or portions of functional elements described herein.

FIG. 5 depicts a high-level block diagram of a computer, computing or electronic device suitable for use in implementing, inter alia, USP endpoints, as well as other network elements and/or devices.

Referring to FIG. 5, the computer 1000 includes one or more processors 1002 (e.g., a central processing unit (CPU) or other suitable processor(s)) and a memory 1004 (e.g., random access memory (RAM), read only memory (ROM), and the like). The computer 1000 also may include a cooperating module/process 1005. The cooperating process 1005 may be loaded into memory 1004 and executed by the processor 1002 to implement functions as discussed herein and, thus, cooperating process 1005 (including associated data structures) may be stored on a computer readable storage medium (e.g., RAM memory, magnetic or optical drive or diskette, or the like).

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing endpoints, clients, gateways, nodes, agents, controllers, computers, cloud based servers, web servers, proxies or proxy servers, application servers, and the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, endpoints, clients, gateways, nodes, agents controllers, computers, cloud based servers, web servers, application servers, proxies or proxy servers, and the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The endpoints, clients, gateways, nodes, agents, controllers, computers, cloud based servers, web servers, application servers, proxies or proxy servers, and the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A User Services Platform administrative authority endpoint device comprising:
    a memory storing computer readable instructions; and
    at least one processor configured to execute the computer readable instructions to cause the User Services Platform administrative authority endpoint device to
        receive a User Services Platform message identifying a connected device, the User Services Platform message being a reportNewDevice! message from a discovery authority device,
        determine, from among a plurality of services, an applicable service for the connected device based on the User Services Platform message identifying the connected device,
        provision service elements for the applicable service to a User Services Platform endpoint associated with the applicable service and the connected device, the User Services Platform endpoint being different from the connected device and the discovery authority device, and the service elements enabling the User Services Platform endpoint to implement the applicable service in association with the connected device, and
        receive notification that the service elements for the applicable service have been provisioned at the User Services Platform endpoint.

2. The User Services Platform administrative authority endpoint device of claim 1, wherein
    the User Services Platform message includes identification information identifying the connected device; and
    the at least one processor is further configured to execute the computer readable instructions to cause the User Services Platform administrative authority endpoint device to determine the applicable service by searching a catalog of the plurality of services based on the identification information.

3. The User Services Platform administrative authority endpoint device of claim 2, wherein the identification information includes at least one of a manufacturer, a serial number, or an agent endpoint ID for the connected device.

4. The User Services Platform administrative authority endpoint device of claim 1, wherein the at least one processor is further configured to execute the computer readable instructions to cause the User Services Platform administrative authority endpoint device to
    receive a User Services Platform onboard request notification message from an agent at the connected device, the User Services Platform onboard request notification message indicating receipt of a set of User Services Platform home automation configuration messages for the applicable service at the connected device, and
    provision the service elements to the User Services Platform endpoint in response to the User Services Platform onboard request notification message.

5. The User Services Platform administrative authority endpoint device of claim 4, wherein the set of User Services Platform home automation configuration messages configure the connected device to establish a User Services Platform session with a controller at the User Services Platform administrative authority endpoint device, the User Services Platform session associated with the applicable service.

6. The User Services Platform administrative authority endpoint device of claim 1, wherein the at least one processor is further configured to execute the computer readable instructions to cause the User Services Platform administrative authority endpoint device to
    output a set of User Services Platform home automation configuration messages to the connected device to configure the connected device to provide the applicable service.

7. The User Services Platform administrative authority endpoint device of claim 6, wherein the set of User Services Platform home automation configuration messages includes information enabling an agent at the connected device to establish a User Services Platform session with a controller at the User Services Platform endpoint.

8. The User Services Platform administrative authority endpoint device of claim 1, wherein the at least one processor is further configured to execute the computer readable instructions to cause the User Services Platform administrative authority endpoint device to provision the service elements by
    initiating acquisition, at the User Services Platform endpoint, of software modules associated with the applicable service,
    initiating acquisition, at the User Services Platform endpoint, of security and communication information for the connected device, and
    initiating activation of the software modules at the User Services Platform endpoint.

9. A User Services Platform endpoint device comprising:
    a memory storing computer readable instructions; and
    at least one processor configured to execute the computer readable instructions to cause the User Services Platform endpoint device to
        acquire software modules associated with an applicable service in response to a User Services Platform software download command message, the applicable service associated with a connected device attached to a local network, the connected device being different from the User Services Platform endpoint device,
        acquire security and communication information associated with the connected device in response to User Services Platform security and communication information messages,
        activate the acquired software modules to onboard service elements for the applicable service at the User Services Platform endpoint device,
        output a User Services Platform event notification message to an administrative authority endpoint device, the User Services Platform event notification message being a reportOnboardedDevice! message including identification information for the connected device, and the User Services Platform event notification message indicating that the service elements for the applicable service have been onboarded at the User Services Platform endpoint device.

10. The User Services Platform endpoint device of claim 9, wherein the identification information for the connected device includes at least one of a manufacturer, a product class, a serial number, or agent endpoint ID.

11. A User Services Platform discovery authority endpoint device comprising:
    a memory storing computer readable instructions; and
    at least one processor configured to execute the computer readable instructions to cause the User Services Platform discovery authority endpoint device to determine that applicable services are available for a connected device attached to a local network based on a neighbor discovery protocol message from the connected device; and output a User Services Platform device notification message to a User Services Platform endpoint associated with the local network, the User Services Platform device notification message being a report-NewDevice! message and including identification information identifying the connected device;

wherein the User Services Platform discovery authority endpoint device is different from the connected device.

12. The User Services Platform discovery authority endpoint device of claim 11, wherein the identification information for the connected device includes at least one of a manufacturer, a product class, a serial number, or an agent endpoint ID.

13. The User Services Platform discovery authority endpoint device of claim 11, wherein the at least one processor is further configured to execute the computer readable instructions to cause the User Services Platform discovery authority endpoint device to interrogate a catalog of devices stored in a database or repository to determine that applicable services are available for the connected device.

14. The User Services Platform discovery authority endpoint device of claim 11, wherein the neighbor discovery protocol message is a User Services Platform Domain Name Service-Service Definition (DNS-SD) message.

* * * * *